No. 850,244. PATENTED APR. 16, 1907.
J. A. NABERS.
MEANS FOR PROTECTING RIVER BANKS.
APPLICATION FILED OCT. 22, 1906.
2 SHEETS—SHEET 1.
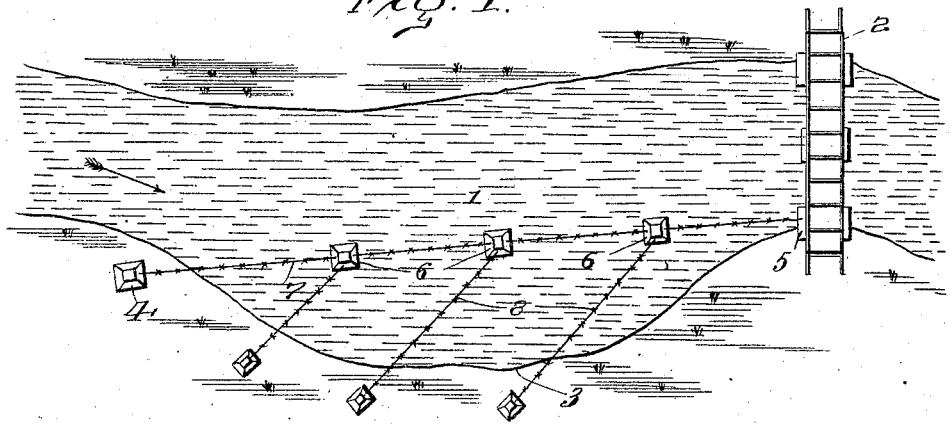
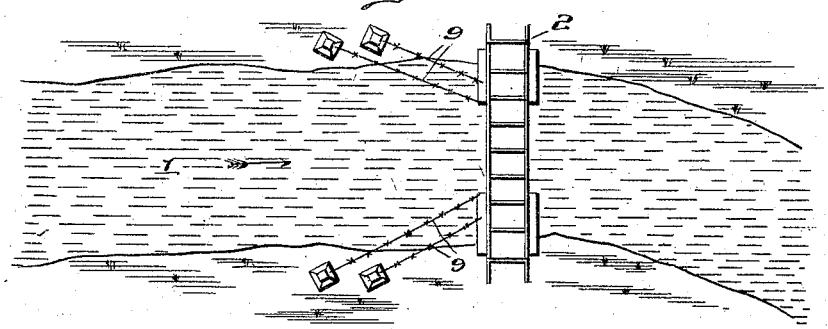
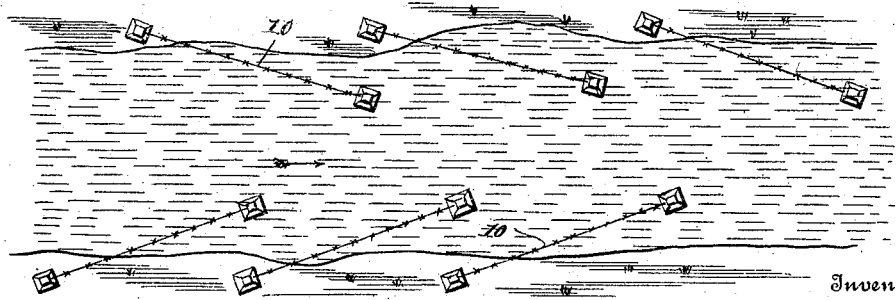

No. 850,244. PATENTED APR. 16, 1907.
J. A. NABERS.
MEANS FOR PROTECTING RIVER BANKS.
APPLICATION FILED OCT. 22, 1906.
2 SHEETS—SHEET 2.
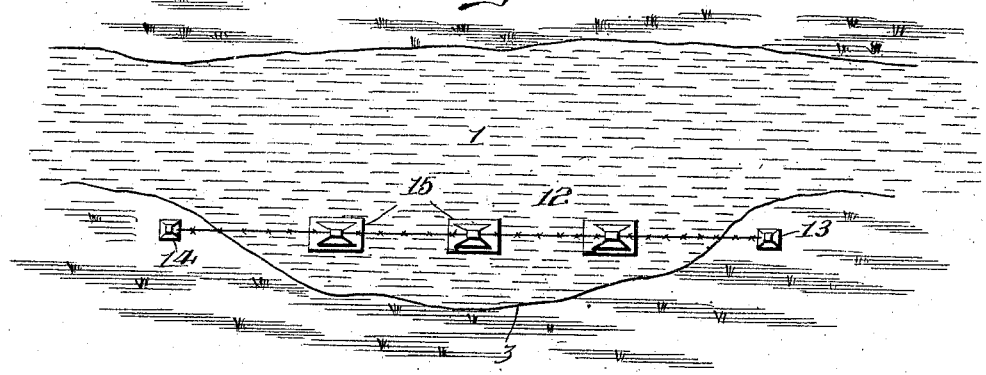
Fig. 4.
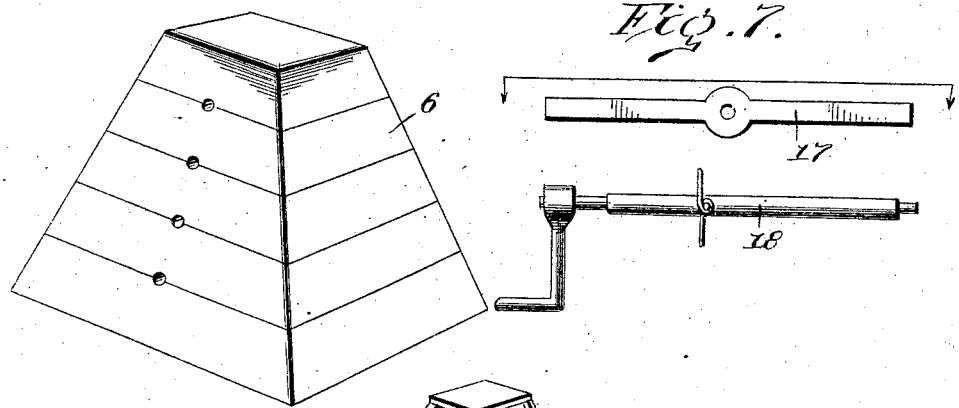
Fig. 7.
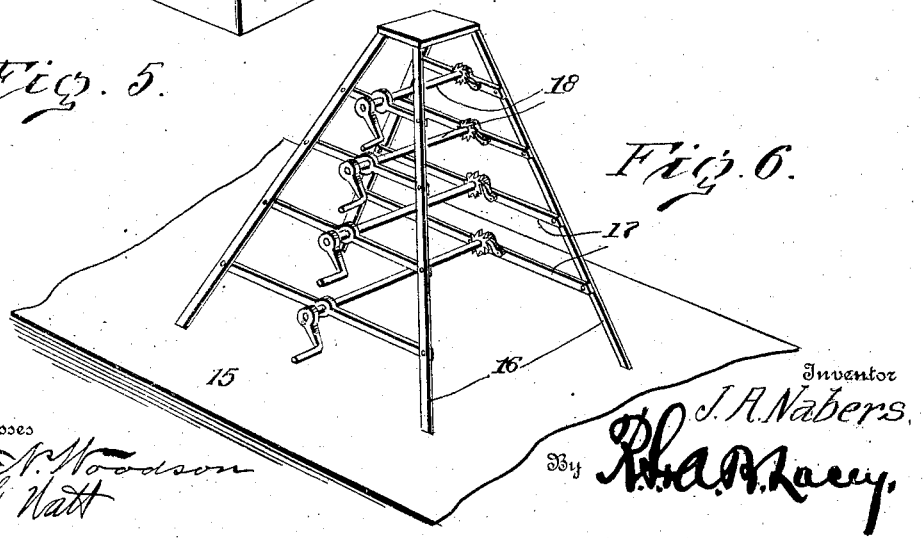
Fig. 5.
Fig. 6.
Witnesses
N. Woodson
G. G. Watt
Inventor
J. A. Nabers
By R. A. P. Lacey,
Attorneys

UNITED STATES PATENT OFFICE.

JOHN A. NABERS, OF VERNON, TEXAS.

MEANS FOR PROTECTING RIVER-BANKS.

No. 850,244.     Specification of Letters Patent.     Patented April 16, 1907.

Application filed October 22, 1906. Serial No. 340,049.

*To all whom it may concern:*

Be it known that I, JOHN A. NABERS, a citizen of the United States, residing at Vernon, in the county of Wilbarger and State of Texas, have invented certain new and useful Improvements in Means for Protecting River-Banks, of which the following is a specification.

This invention is designed to provide means for confining flowing streams to their natural course and prevent encroachment upon adjoining territory by washing away the banks and causing the same to cave in.

The invention may be successfully used in connection with such watercourses as are dry for a part of the time or which are continually filled with flowing water, the means serving in windy weather to collect and cause the formation of a bank and which means during a freshet catch grass and other flowing material, which in time either results in the formation of a bank or prevents washing out and caving in of banks at certain places.

The invention contemplates the use of barbed wire and supporting means therefor, the barbed wire being spaced apart and attached to suitable supports and arranged to protect that part of the bank liable to erosive action or to be located where a bank is to be formed, so as to reclaim land and prevent further encroachment of the river or other flowing water.

For a full description of the invention and the merits thereof and also to acquire a knowledge of the details of construction and the means for effecting the result reference is to be had to the following description and accompanying drawings, in which—

Figure 1 is a top plan view of a river or watercourse spanned by a bridge and having an indentation in the bank protected by means embodying the invention. Fig. 2 is a view similar to Fig. 1, showing a different arrangement of the barbed wires and other supports. Fig. 3 illustrates a further modification. Fig. 4 shows a further modification and illustrates floats constituting supporting means for the towers or like attaching means for the barbed wires. Fig. 5 is a detail view of a pier, showing the manner of attaching the barbed wires thereto. Fig. 6 is a detail view of a float and the tower erected thereon. Fig. 7 is a detail view of the tower, showing more clearly the means for stretching or tightening the barbed wire.

Corresponding and like parts are referred to in the following description and indicated in all the views of the drawings by the same reference characters.

In accordance with this invention, which, as stated, is equally well adapted for watercourses over which the water continually flows or which is dry at certain periods, barbed wire of any make or design is arranged opposite to the part of the bank to be protected or is located at such point where a bank is to be formed, so as to reclaim land already occupied by a portion of the water.

In Fig. 1 the watercourse 1 is spanned by means of a bridge 2 and is indented, as indicated at 3. It being desired to prevent further encroachment of the water along the bank of the indentation 3, as also to reclaim all or a part of the land encroached upon, a fence or projection is located opposite to the indentation and approximately at a tangent to the current of the water. Points 4 and 5 having been selected as terminals of the fence or riparian work, a series of wires are stretched between said points and are secured thereto and at suitable intervals in their length, so as to provide a substantial structure capable of resisting the action of the stream and the load and strain resulting from material collecting on and about the fence. As indicated most clearly in Fig. 5, the supports 6 are of masonry, and at suitable intervals in the height thereof—say from six to eight inches—the wires 7 are embedded, the terminals of the wires being secured at or near the points 4 and 5 in any manner. The ends of the wires 7 near the bridge 2 are preferably secured to one of the bridge-piers, whereas the opposite ends near the point 4 are anchored in the bank in any substantial manner to insure their firm holding. Other wires 8 extend from the supports or piers 6 to points along the bank of the indentation and are anchored to said bank, said wires inclining upstream, so as to catch floating material—such as grass, branches or trees, and the like—and this material lodging against the wires of the protective fence accumulates and causes the deposit of silt, mud, and like earthy matter, whereby in a comparatively short time the indentation is filled and the bank corresponds to the fencing 7.

In the construction shown in Fig. 2 the watercourse 1 is spanned by means of a bridge 2, fences being erected at the ends of the bridge to protect the same. The fences 9 are inclined upstream and are attached at one end to piers near the ends of the bridge, the opposite ends of the fences being anchored to the banks in any substantial manner. It will be observed that the fences 9 flare toward the head of the stream, thereby directing the latter inward and away from the ends of the bridge and preventing the water from working around and weakening the terminal supports or the banks adjacent thereto.

Fig. 3 shows a different arrangement of the fences, the same jutting out from opposite banks and inclined outward and downward from the respective banks. The outer ends of the fence-wires are attached to piers supported upon the bed of the stream, the opposite ends of the wires being anchored to piers on the banks. The fences 10 along one bank alternate with the fences at the opposite bank, thereby insuring the lodgment of foreign matter upon the fences, with the result that the banks are protected and prevented from caving in and being washed away. The inner ends of the fences 10 do not overlap, thereby leaving an unobstructed passage mid-stream for a rapid current, which soon results in deepening the stream or watercourse at any desired point.

In the construction shown in Fig. 4 the watercourse 1 is formed with an indentation 3, the bank of which is protected, so as to prevent further encroachment of the water and to secure an extension of the bank, so as to confine the stream. The fence-wires 12 are anchored at their ends in the bank at points 13 and 14 and are suitably supported intermediate of their ends. Each of the intermediate supports consists of a float 15, the same being a barge, scow, or like type of boat. Upon the float, barge, or like device 15 is erected a tower, the same comprising side pieces which are oppositly inclined and connected at their upper ends, each side piece being formed of oppositely-inclined poles 16 and connecting-bars 17, the latter being hollow and supporting shafts 18, which are journaled in opposite bars 17. The shafts 18 are provided at one end with a crank-handle and with suitable ratchet mechanism or other means to hold them in an adjusted position. The fence-wires 12 are attached to the shafts 18, and upon turning the latter any slack in the fence-wires may be taken up to prevent sagging and to cause the wires to extend in a straight course between the points 13 and 14.

It is to be understood that any kind of wire or like strand may be employed in constructing the protective fencing; but for all practical purposes barbed wire is preferred, since it is best adapted for catching floating matter. It is also noted that the wires or strands may be single or provided in any number, the purpose being to construct a wire entanglement for catching moving trash and precipitating silt and the like.

The invention is admirably adapted to long stretches of river frontage, so as to take advantage of the general course of the river. As illustrated in the drawings, the protective means may be employed on one side or bank of the stream or upon both sides, according to the protection required. In the form of fencing utilizing the windlass 18 it is preferred to form the wire in a loop and engage such loop over a pin projected from the windlass, so that upon rotating the latter the wire is drawn from opposite directions.

Having thus described the invention, what is claimed as new is—

1. Means for protecting the bank of a river, stream, or similar watercourse, the same consisting of a series of wires arranged to form a fence extending in a straight line approximately at a tangent to the current of the water and piers between which said wires are stretched.

2. Means for protecting the bank of a river or other watercourse, the same consisting of a wire fencing arranged approximately at a tangent to the current of the water, and other wire fencing extended from the tangentially-arranged wire fence and inclined therefrom in a direction upstream.

3. Means for protecting the bank of a river, stream or similar watercourse, the same consisting of a series of wires arranged to form a fence and located in the course of the water, the said fence extending approximately at a tangent to the current of the water and including terminal piers and intermediate piers, another wire fence extending from the intermediate piers toward the shore and inclined from said intermediate piers in a direction upstream, and other piers connected to the shore ends of the last-named wire fence.

4. Means for protecting the banks of rivers, streams, or similar watercourses, the same consisting of a line of wires 7 located within the stream and extending approximately tangentially to the current of the stream, terminal piers and intermediate piers between which said wires are stretched, the intermediate piers being located within the stream, and a plurality of parallel other wires 8 connected to the intermediate piers and extending therefrom in an inclined direction upstream and piers secured to the shore ends of the said last-named wires.

In testimony whereof I affix my signature in presence of two witnesses.

JOHN A. NABERS. [L. S.]

Witnesses:
W. B. TOWNSEND,
C. Q. CRAWFORD.